(12) United States Patent
Uehara et al.

(10) Patent No.: US 8,054,422 B2
(45) Date of Patent: Nov. 8, 2011

(54) LIQUID CRYSTAL DISPLAY DEVICE

(75) Inventors: Shinichi Uehara, Tokyo (JP); Jin Matsushima, Tokyo (JP); Ken Sumiyoshi, Tokyo (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 30 days.

(21) Appl. No.: 11/860,875

(22) Filed: Sep. 25, 2007

(65) Prior Publication Data

US 2008/0018840 A1 Jan. 24, 2008

Related U.S. Application Data

(63) Continuation-in-part of application No. 11/690,057, filed on Mar. 22, 2007.

(30) Foreign Application Priority Data

Mar. 27, 2006 (JP) .................................. 2006-086629
Mar. 19, 2007 (JP) .................................. 2007-070279

(51) Int. Cl.
*G02F 1/1335* (2006.01)
(52) U.S. Cl. ........................................ 349/114; 349/141
(58) Field of Classification Search .................. 349/114, 349/141
See application file for complete search history.

(56) References Cited

U.S. PATENT DOCUMENTS

| | | | |
|---|---|---|---|
| 5,361,151 A | 11/1994 | Sonehara et al. | |
| 6,650,385 B1 * | 11/2003 | Liu | 349/113 |
| 6,650,472 B1 | 11/2003 | Adachi et al. | |
| 6,654,093 B1 | 11/2003 | Kim | |
| 6,822,711 B1 | 11/2004 | Yoshida et al. | |
| 6,914,656 B2 | 7/2005 | Sakamoto et al. | |
| 7,164,456 B2 * | 1/2007 | Jin et al. | 349/114 |
| 7,420,635 B2 * | 9/2008 | Ozawa | 349/114 |
| 2003/0123000 A1 | 7/2003 | Sugiura et al. | |
| 2003/0218664 A1 * | 11/2003 | Sakamoto et al. | 347/114 |
| 2004/0004681 A1 | 1/2004 | Ozawa et al. | |
| 2004/0051945 A1 | 3/2004 | Adachi et al. | |
| 2004/0057110 A1 | 3/2004 | Adachi et al. | |
| 2004/0160537 A1 | 8/2004 | Okamoto et al. | |
| 2004/0196422 A1 | 10/2004 | Arai et al. | |

(Continued)

FOREIGN PATENT DOCUMENTS

| | | |
|---|---|---|
| CN | 1474216 A | 2/2004 |
| JP | 2003-344837 A | 12/2003 |
| JP | 2005-106967 A | 4/2005 |

OTHER PUBLICATIONS

T.B. Jung, et al., "A Novel Transflective Display Associated with Fringe-Field Switching", SID Digest, 2003, pp. 592-595, Boe-Hydis Technology Co., Ltd.

(Continued)

*Primary Examiner* — Thanh-Nhan Nguyen
(74) *Attorney, Agent, or Firm* — Sughrue Mion, PLLC

(57) ABSTRACT

To improve a patterning accuracy of pixel electrodes and common electrodes. The liquid crystal display device includes a reflective display area and a transmissive display area within a pixel that is configured with a pair of opposing substrates and a liquid crystal layer provided between the substrates. The reflective display area achieves display by reflection of light, and the transmissive display area achieves display by transmission of light. A laminated body including a reflective plate, an insulating layer, and a metal electrode for rotating liquid crystal molecules of the liquid crystal layer within a surface thereof is provided within the reflective display area.

11 Claims, 11 Drawing Sheets

U.S. PATENT DOCUMENTS

| | | |
|---|---|---|
| 2004/0257506 A1 | 12/2004 | Tashiro et al. |
| 2005/0128390 A1* | 6/2005 | Yang ............................ 349/114 |
| 2005/0179841 A1* | 8/2005 | Yang ............................ 349/114 |
| 2005/0185120 A1* | 8/2005 | Kitoh et al. ................... 349/114 |
| 2005/0243256 A1* | 11/2005 | Yang et al. .................... 349/141 |
| 2006/0170845 A1* | 8/2006 | Lee ............................... 349/114 |
| 2006/0256264 A1* | 11/2006 | Yang et al. .................... 349/114 |
| 2006/0256268 A1* | 11/2006 | Jeong et al. ................... 349/141 |
| 2007/0146591 A1* | 6/2007 | Kimura et al. ................. 349/114 |
| 2009/0207351 A1* | 8/2009 | Nakayoshi et al. ............ 349/114 |

OTHER PUBLICATIONS

Makoto Jisaki, et al., "Development of Transflective LCD for High Contrast and Wide Viewing Angle by Using Homeotropic alignment", Asia Display, IDW, 2001, pp. 133-136, Sony Corporation Core Technology & Network Company.

Takashi Sato, et al., Ekisho, pp. 245-251, vol. 9, No. 4, Japanese Liquid Crystal Society.

* cited by examiner

RELATED ART

US 8,054,422 B2

1

LIQUID CRYSTAL DISPLAY DEVICE

This application is based upon and claims the benefit of priority from Japanese patent application No. 2006-086629, filed on Mar. 27, 2006 and Japanese patent application No. 2007-070279, filed on Mar. 19, 2007, the disclosure of which is incorporated herein in its entirety by reference.

CROSS-REFERENCE TO RELATED APPLICATIONS

This application is a continuation-in-part application of U.S. patent application Ser. No. 11/690,057, filed on Mar. 22, 2007.

BACKGROUND OF THE INVENTION

1. Field of the Invention

The present invention relates to a liquid crystal display device and, in particular, to a liquid crystal display device including a reflective display area which reflects incident external light for display and a transmissive display area which transmits light from the backside for display.

2. Description of the Related Art

Recently, the liquid crystal display device, which has the advantage of thin, light-weight, small, and low power consumption, is widely installed in and used for large size terminal devices such as monitors and televisions, middle size terminal devices such as laptop computers, cash dispensers, and vending machines, and small size terminal devices such as PDAs (Personal Digital Assistance), mobile telephones, and portable game devices.

In the liquid crystal display device, the liquid crystal molecules themselves do not emit light. Thus, some kinds of light are required for users to visually recognize the display. In general, the liquid crystal display devices can be roughly divided into a transmission type, a reflection type, and a semi-transmission type that uses both the transmitted light and the reflected light according to a type of a light source. The reflection type can utilize the external natural light for display so that low power consumption can be achieved. However, the display performance thereof such as the contrast level is inferior compared to the transmission type. Therefore, the transmission type and the semi-transmission type liquid crystal display devices are the mainstream nowadays.

The transmission type and the semi-transmission type liquid crystal display devices includes a light source provided at the back face, and use the light emitted from the light source to achieve display. In particular, medium or small size liquid crystal display devices are carried by users and used under various conditions. Therefore, the semi-transmission type liquid crystal display devices, which exhibit high visibility under any kinds of conditions through allowing users to visually recognize the reflective display at a bright place and the transmissive display at a dark place, are employed for the medium or small liquid crystal display devices.

The film compensated TN mode or the multi-domain vertical alignment mode has been used for the semi-transmission type liquid crystal display devices. However, it is proposed to apply the IPS (In-plane-switching) mode, which provides a wide viewing angle in principle, to the semi-transmission type.

FIG. 10 shows a liquid crystal display device of IPS mode that is disclosed in Japanese Patent Application Laid-open No. 2003-344837 (Patent Document 1). A semi-transmission type liquid crystal display device 1053 shown in FIG. 10A

2 includes a lower substrate 1oll, an opposed side substrate 1012, a liquid crystal layer 1013 interposed between the lower substrate 1011 and the opposed side substrate 1012, a backlight 1028 placed underneath the lower substrate 1011, and polarizing plates 1021a, 1021b.

The lower substrate 1011 includes a half wavelength plate 1029, a transparent insulating substrate 1022a, and an insulating film 1008a. The upper substrate 1012 includes an insulating film 1022b.

The semi-transmission type liquid crystal display device 1053 includes a reflective area 1005 and a transmissive area 1006. The reflective area 1005 is an area that achieves display by reflecting external incident light, and the transmissive area 1006 is an area that achieves display by transmitting light from the backlight 1028.

In the reflective area 1005, a laminated body configured with insulating films 1008a, 1008b, a reflective plate 1009, and an insulating film 1008c is provided, and the liquid crystal layer 1013 is set to be in a thickness that corresponds to $\lambda/4$ light wavelength. In the transmissive area 1006, the thickness of the liquid crystal layer 1013 is set to be in a thickness that corresponds to $\lambda/2$ light wavelength. Further, a horizontal electric field driving electrode 1007, which is configured with a pixel electrode 1027 and a common electrode 1026 arranged in a lateral direction on the insulating film 1008c, is provided in the reflective area 1005. Furthermore, a horizontal electric field driving electrode 1007, which is configured with a pixel electrode 1027 and a common electrode 1026 arranged in a lateral direction on the insulating film 1008a, is provided in the transmissive area 1006.

As shown in FIG. 10B, when no voltage is applied between the common electrode 1026 and the pixel electrode 1027, the polarizing plate 1021b is arranged at an angle of 90 degrees and the liquid crystal layer 1013 is arranged at an angle of 45 degrees provided that the lower-side polarizing plate 1021a in the reflective area 1005 and the transmissive area 1006 is arranged at an angle of 0 degree. A twist angle of the liquid crystal layer 1013 is 0 degree. The half wavelength plate 1029 is arranged at an angle of 135 degrees.

As shown in FIG. 10C, when no voltage is applied between the pixel electrode 1027 and the common electrode 1026 in the reflective area 1005, linear polarized light arranged at an angle of 90 degrees which has passed through the polarizing plate 1021b becomes clockwise circular polarized light after passing through the liquid crystal layer 1013, and becomes counterclockwise circular polarized light after being reflected by the reflective plate 1009. Then, it becomes linear polarized light arranged at an angle of 0 degree after passing through the liquid crystal layer 1013. Therefore, the linear polarized light cannot emerge therefrom, thereby resulting in a black display.

When a voltage is applied between the pixel electrode 1027 and the common electrode 1026 in the reflective area 1005, the arranged angle of the liquid crystal layer 1013 is changed to 0 degree, so that the linear polarized light arranged at an angle of 90 degrees which has passed through the polarizing plate 1021b is reflected by the reflective plate 1009 as it is in the state of the linear polarized light even after passing through the liquid crystal layer 1013. Then, it passes through the liquid crystal layer 1013 again, and emerges therefrom as it is in the state of the linear polarized light arranged at an angle of 90 degrees, thereby resulting in a white display.

When no voltage is applied to the liquid crystal layer 1013 in the transmissive area 1006, linear polarized light arranged at an angle of 0 degree which has passed through the polarizing plate 1021a becomes linear polarized light arranged at an angle of 90 degrees after passing through the half wavelength plate 1029. When it passes through the liquid crystal layer 1013, the light rotates still further to be turned into linear polarized light arranged at an angle of 0 degree. The linear polarized light arranged at an angle of 0 degree cannot emerge from the polarizing plate 1021b arranged at an angle of 90 degrees, thereby resulting in a black display.

When a voltage is applied to the liquid crystal layer 1013 in the transmissive area 1006, the arranged angle of the liquid crystal layer 1013 is changed into 0 degree. In this state, linear polarized light arranged at an angle of 0 degree which has passed through the polarizing plate 1021a becomes linear polarized light arranged at an angle of 90 degrees after passing through the half wavelength plate 1029. The arranged angle of the linear polarized light is not rotated further even after passing though liquid crystal layer 1013. Therefore, the linear polarized light arranged at an angle of 90 degrees emerges from the polarizing plate 1021b arranged at an angle of 90 degrees, thereby resulting in a white display.

Next, structures of the pixel electrode and the common electrode disclosed in Patent Document 1 will be described by referring to FIG. 11. As shown in FIG. 11, in the reflective area 1005, a rough-surface reflective plate 1009 is formed on the insulating film 1008b, the planarizing film 1008c is formed on the rough-surface reflective plate 1009, and the pixel electrode 1027 and the common electrode 1026 are formed on the planarizing film 1008c with a transparent conductive film such as ITO.

However, the structures shown in FIG. 11 have such a problem that an edge of a resist cannot be exposed uniformly due to diffused reflection of the exposure light reflected by the rough-surface reflective plate and that the patterning accuracy becomes poor as a result, when the pixel electrode 1027 and the common electrode 1026 in the reflective area 1005 are patterned by the exposure. That is, when ITO is formed in the reflective area 1005 and it is exposed after applying a resist thereon, the exposure light is reflected by the rough-surface reflective plate 1009 after transmitting through the ITO, thereby exposing the resist from the back side as well. The rough-surface reflective plate 1009 is structured to diffusedly reflect the incident light from the front to suit the reflection display. Therefore, the reflected light reaches even to the unintended area of the resist, so that patterning cannot be performed as desired.

SUMMARY OF THE INVENTION

It is therefore an exemplary object of the present invention is to provide a liquid crystal display device in which the patterning accuracy of the pixel electrode and the common electrode is improved.

In order to achieve the foregoing object, a liquid crystal display device according to an exemplary aspect of the present invention includes a reflective display area and a transmissive display area within a pixel that is configured with a pair of opposing substrates and a liquid crystal layer provided between the substrates, wherein:

the reflective display area achieves display by reflection of light, and the transmissive display area achieves display by transmission of light; and a laminated body including a reflective plate, an insulating layer, and a metal electrode for rotating liquid crystal molecules of the liquid crystal layer within a surface thereof is provided within the reflective display area.

As an exemplary advantage according to the invention, the present invention is capable of improving the patterning accuracy through avoiding the influence of the diffused reflection from the reflective plate imposed upon the resist film, by using the metal layer for the electrode.

EXEMPLARY EMBODIMENT

In the followings, exemplary embodiments of the present invention will be described in detail by referring to the accompanying drawings.

First Exemplary Embodiment

Figure 1:
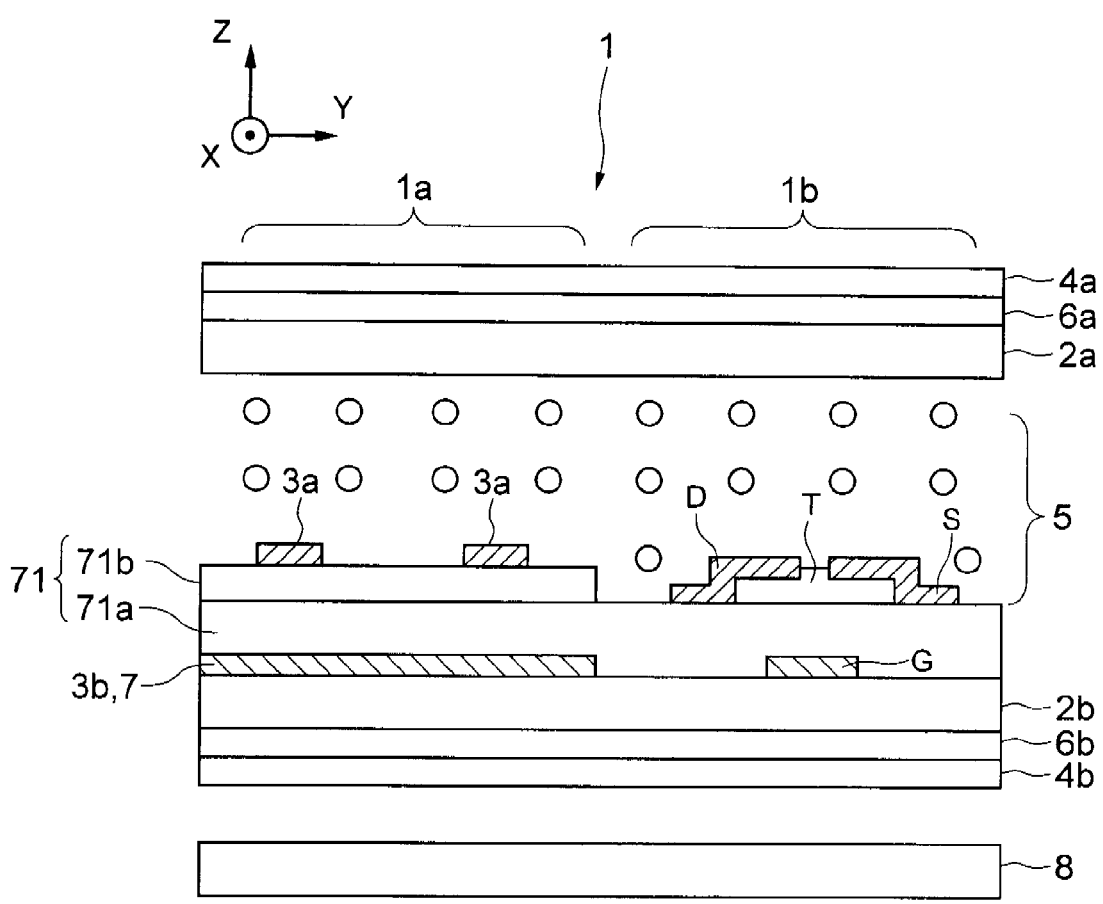
FIG. 1 is a cross-sectional view showing a structure of a liquid crystal display device according to a first exemplary embodiment of the present invention.

As shown in FIG. 1, a pixel of a liquid crystal display device 1 according to a first exemplary embodiment of the present invention includes a pair of substrates 2a, 2b, and a liquid crystal layer 5 interposed between the both substrates 2a, 2b.

The pixel is sectioned into a reflective display area 1a and a transmissive display area 1b. The reflective display area 1a of the pixel performs display by reflecting the light that enters from the outside, and the transmissive display area 1b of the pixel performs display by transmitting the light that enters from the back-face side. FIG. 1 only shows a single pixel in a cross-sectional view. However, a plurality of pixels, which respectively include the reflective display area 1a and the transmissive display area 1b shown in FIG. 1, are arranged in matrix in the liquid crystal display device according to the exemplary embodiment of the present invention. An electric field in a parallel direction with respect to the substrate face is applied to the liquid crystal layers 5 in each of the reflective display areas 1a and the transmissive display areas 1b of the plurality of pixels, and the liquid crystal molecules of the liquid crystal layers 5 are rotationally driven within the substrate face. FIG. 1 is a cross-sectional view, in which only the parts that shows the feature point of the first exemplary embodiment of the present invention are indicated with oblique lines.

Further, circular polarizing plates 4a and 4b are provided on the outer side of the substrate 2a and the substrate 2b. Furthermore, compensation plates 6a, 6b for decreasing the refractive anisotropy of the liquid crystal layer 5 are provided between the circular polarizing plates 4a, 4b and the substrates 2a, 2b, respectively. The circular polarizing plates 4a and 4b are in a structure where a polarizing plate that generates linear polarized light and a quarter wavelength plate are combined. Further, a backlight 8 used for the transmission display is provided at the back face of the circular polarizing plate 4b in the transmissive display area 1b.

As shown in FIG. 1, FIG. 5, and FIG. 6-FIG. 9, in the exemplary embodiment of the present invention, a laminated body that is configured with a reflective plate 7, an insulating layer 71, and a metal electrode 3a, 3b for rotating the liquid crystal layer 5 within the surface is provided within the reflective display area 1a, 11a, 14a, 18a, 19a, 20a as the basic structure.

In the first exemplary embodiment shown in FIG. 1, the reflective plate 7 and the metal electrode are formed as one body. The reflective plate 7 is used as the common electrode 3b. A laminated body, which includes the common electrode (metal electrode) 3b that serves also as the reflective plate 7 and rotates the liquid crystal layer 5 within the surface, the pixel electrodes (metal electrode) 3a, and the insulating layer 71, is formed within the reflective display area la. Further, when a thin film transistor for driving the pixel electrodes and the common electrode is provided in the transmissive display area 1b, the common electrode 3b serving also as the reflective plate 7 is formed by using the electrode metal layer of the thin film transistor.

Specifically, a gate electrode G of a thin film transistor T is formed on the substrate 2b in the transmissive display area 1b. Furthermore, the common electrode 3b serving also as the reflective plate 7 is formed on the substrate 2b in the reflective display area 1a by using the same metal layer as that of the gate electrode G of the thin film transistor T.

Further, an insulating layer 71a is deposited on the common electrode 3b and the gate electrode G of the thin film transistor T, and a drain electrode D and a source electrode S of the thin film transistor T are formed on the insulating layer 71a.

Furthermore, an insulating layer 71b is formed on the insulating layer 71a in the reflective display area 1a, and the pixel electrodes 3a are formed on the insulating layer 71b by using the same metal layer as that of the drain electrode D of the thin film transistor T. The pixel electrodes 3a may also be formed by using the same metal layer as that of the source electrode S of the thin film transistor T.

Further, although not shown, pixel electrodes and a common electrode driven by the thin film transistor T are formed in the transmissive display area 1b.

Furthermore, the liquid crystal layer 5 between the pixel electrodes 3a and the substrate 2a in the reflective display area 1a is set to be in a size that corresponds to $\lambda/4$ ($\lambda$: light wavelength). Moreover, the liquid crystal layer 5 between the pixel electrodes and the common electrodes (not shown), and the substrate 2a in the transmissive display area 1b is set to be in a size that corresponds to $\lambda/2$ ($\lambda$: light wavelength).

Further, the pixel electrodes and the common electrode (not shown) in the transmissive display area 1b are respectively formed in a comb-like shape, and each of the electrodes are electrically insulated from each other and disposed alternately. Furthermore, the pixel electrodes 3a on the insulating layer 71b and the common electrode 3b on the substrate 2b in the reflective display area 1a are respectively formed in a comb-like shape.

When an X-Y-Z Cartesian coordinate system is set in FIG. 1, a direction in which the comb-shaped pixel electrodes and the comb-shaped common electrodes (not shown) in the transmissive display area 1b are arranged alternately becomes the Y-axis direction. Further, a direction in which the comb-shaped pixel electrode and the comb-shaped common electrode in the reflective display area 1a extend, that is a longitudinal direction of the teeth of the comb-shaped electrodes becomes the X-axis direction Furthermore, a display surface of the liquid crystal display device 1 becomes an XY plane. Looking at the structure in the Z-axis direction, the backlight 8, the circular polarizing plate 4b, the compensation plate 6b, the substrate 2b, the liquid crystal layer 5, the substrate 2a, the compensation plate 6a, and the circular polarizing plate 4a are laminated from the -Z direction towards the +Z direction.

The circular polarizing plate 4a and the circular polarizing plate 4b are a pair of circular polarizing plates having opposite rotation directions of circular polarization from each other. For example, when the circular polarizing plate 4a generates circular polarized light rotating clockwise with respect to the light making incident from the -Z direction, the circular polarizing plate 4b generates circular polarized light rotating counterclockwise with respect to the light making incident from the +Z direction.

The liquid crystal layer 5 has positive-type liquid crystal molecules having positive dielectric anisotropy. In a primary state where no voltage is applied between the pixel electrodes and the common electrodes, the liquid crystal molecules in the liquid crystal layer 5 are disposed in parallel alignment by using a general alignment processing in such a manner that a longitudinal direction of the liquid crystal molecules of the liquid crystal layer 5 almost meets the X-axis. In the exemplary embodiment, for convenience, a longitudinal direction of the liquid crystal molecules in the liquid crystal layer 5 is set in a 15-degree direction from the +X direction, that is, a direction which is rotated by 15 degrees from the +X direction towards the +Y direction in the XY plane.

The compensation plate 6a is provided for counteracting retardation in a display surface of the reflective display area la so that the liquid crystal layer has optical isotropy. A retardation film of a negative A plate is used as the compensation plate 6a of the exemplary embodiment. In general, retardation films are classified by shapes of three-dimensional index ellipsoid. Two optical axes in the retardation film face are defined as A axis and B axis, and a direction of the thickness thereof is defined as C axis. When the film is a uniaxial medium and the surface thereof has an extraordinary refractive index, it is termed as an A plate by taking the azimuth thereof as the A axis. When the extraordinary refractive index is higher than an ordinary refractive index, the film is termed as a positive A plate, and the film is termed as a negative A plate when it is lower.

The compensation plate 6a according to the exemplary embodiment uses a retardation plate in which a refractive index of the A axis is lower than refractive indexes of the B axis and C axis, and the A axis is arranged along a longitudinal direction of the liquid crystal molecules in the liquid crystal layer 5 of the reflective display area 1a. That is, the A axis is in a direction rotated by 15 degrees from the +X direction towards the +Y direction in the XY plane.

Further, a retardation value of the compensation plate 6a is set in a value with which retardation in the display surface of the liquid crystal 5 in the reflective display area 1a is counteracted when no voltage is applied to the pixel electrodes 3a and the common electrodes 3b so as to provide optical isotropy.

Like the compensation plate 6a, the compensation plate 6b is a retardation film of the negative A plate, and the A axis thereof is arranged along a longitudinal direction of the liquid crystal molecules in the liquid crystal layer 5 of the transmissive display area 1b. That is, the A axis direction of the compensation plate 6b is in a direction rotated by 15 degrees from the +X direction towards the +Y direction in the XY plane. Further, a retardation value of the compensation plate 6b is set in a value with which retardation of the liquid crystal layer 5 in the transmissive display area 1b is counteracted in cooperation with the compensation plate 6a when no voltage is applied to the pixel electrodes 3a and the common electrodes 3b so as to provide optical isotropy.

As shown in FIG. 1, the liquid crystal layer 5 in the transmissive display area 1b of the exemplary embodiment is set to be twice as thick as the liquid crystal layer 5 in the reflective display area 1a, and birefringence of the liquid crystal molecules is the same in the transmissive display area 1b and the reflective display area 1a. Thus, the compensation plate 6a and the compensation plate 6b are the retardation films having completely the same characteristic. Accordingly, the liquid crystal layer 5 in the reflective display area 1a and the liquid crystal layer 5 in the transmissive display area 1b become an isotropic layer where the optical anisotropy of the surface thereof is counteracted.

Figure 2:
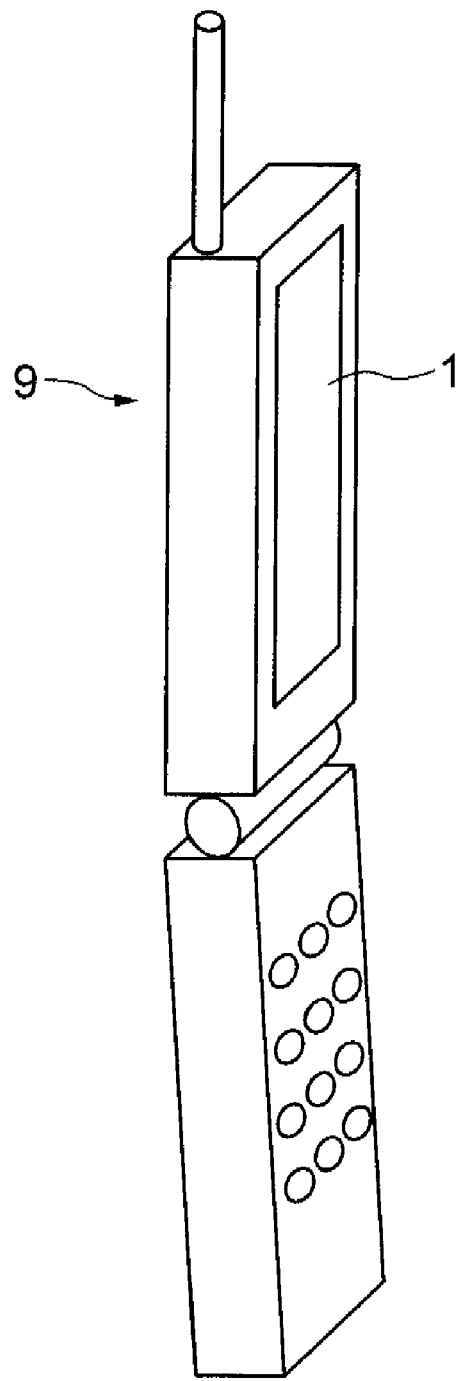
FIG. 2 is a perspective view showing a terminal device on which the liquid crystal display device according to exemplary embodiments of the present invention is mounted.

As shown in FIG. 2, the liquid crystal display device 1 shown in FIG. 1 is mounted on a display part of a mobile telephone 9.

Next, operations of the liquid crystal display device 1 according to the exemplary embodiment shown in FIG. 1 and FIG. 2, that is, optical modulating operations will be described.

Figure 3:
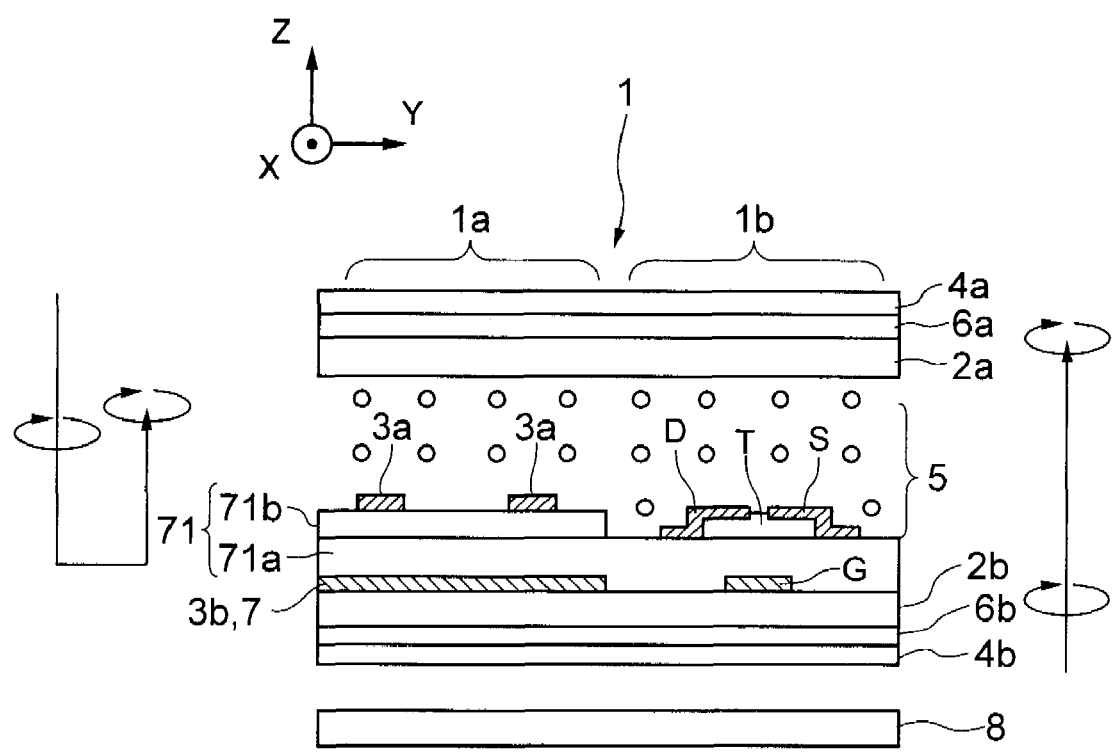
FIG. 3 is a view showing a frame format of an optical operation when no voltage is applied between a pixel electrode and a common electrode which are structural components of the exemplary embodiment illustrated in FIG. 1.

FIG. 3 shows a case where no voltage is applied between the pixel electrodes and the common electrodes, external light entering the circular polarizing plate 4a in the reflective display area 1a becomes clockwise circular polarized light and makes incident on the compensation plate 6a. When no voltage is applied between the pixel electrodes 3a and the common electrode 3b serving also as the reflective plate 7, the refractive index anisotropy in the display surface of the liquid crystal layer 5 in the reflective display area 1a is counteracted by the compensation plate 6a, and refractive index of the liquid crystal layer 5 becomes isotropic. Therefore, the light which has transmitted the compensation plate 6a and the liquid crystal layer 5 in the reflective display area 1a holds the state of being the clockwise circular polarized light and makes incident on the reflective plate 7 (the common electrode 3b).

The light making incident on the reflective plate 7 is converted into counterclockwise circular polarized light when reflected by the reflective plate 7, and makes incident again on the liquid crystal layer 5 and the compensation plate 6a in order. As in the case of the incoming way, the refractive index anisotropy in the display surface of the liquid crystal layer 5 of the reflective display area 1a is counteracted by the compensation plate 6a, and the refractive index of the liquid crystal layer 5 becomes isotropic. Therefore, the light emitted from the compensation plate 6a holds the state of being counterclockwise circular polarized light.

Although the light emitted from the compensation plate 6a makes incident on the circular polarizing plate 4a, the circular polarizing plate 4a transmits the clockwise circular polarized light, and absorbs the counterclockwise circular polarized light. Accordingly, the light does not emerge from the circular polarizing plate 4a, so that display in the reflective display area 1a becomes black. That is, when no voltage is applied to the pixel electrodes 3a and the common electrode 3b, the reflective display area 1a provides a black display.

Further, when no voltage is applied between the pixel electrodes 3a and the common electrode 3b in the transmissive display area 1b, i.e. when the thin film transistor T is not in action, light for the transmissive display emitted from the backlight 8 makes incident on the polarizing plate 4b, and emerges therefrom as the counterclockwise circular polarized light. Then, the light makes incident on the compensation plate 6b, the liquid crystal layer 5, and compensation plate 6a in this order. However, the refractive index anisotropy in the display surface of the liquid crystal layer 5 in the transmissive display area 1b is counteracted by the compensation plate 6b and the compensation plate 6a, and the refractive index of the liquid crystal layer 5 becomes isotropic Thus, the light makes incident on the circular polarizing plate 4a as it is being in the state of the counterclockwise circular polarized light.

The circular polarizing plate 4a in the transmissive display area 1b transmits the clockwise circular polarized light, and absorbs the counterclockwise circular polarized light. Therefore, the light does not emerge from the circular polarizing plate 4a of the transmissive display area 1b, so that display in the transmissive display area 1b becomes black. That is, when no voltage is applied to the pixel electrodes and the common electrode, the display becomes black in the transmissive display area 1b as in the case of the reflective display area 1a.

Figure 4:
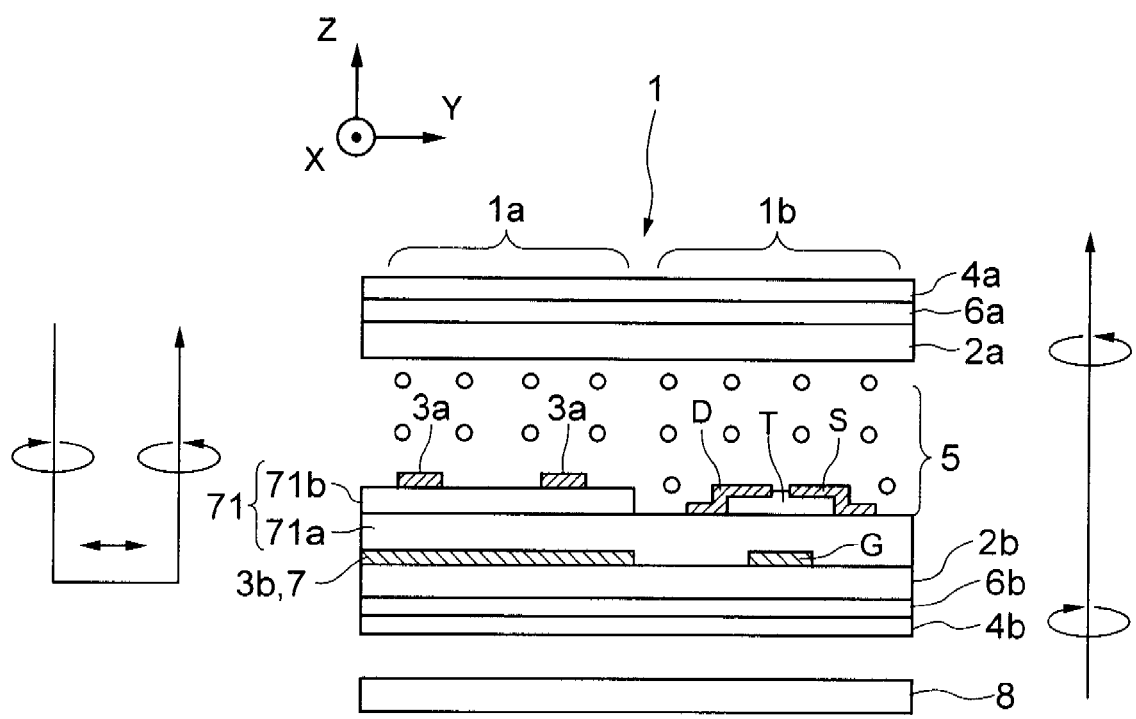
FIG. 4 is a view showing a frame format of an optical operation when a voltage is applied between the pixel electrode and the common electrode which are structural components of the exemplary embodiment illustrated in FIG. 1.

As shown in FIG. 4, when a voltage is applied between the pixel electrodes and the common electrode, i.e. when the thin film transistor T is in action, the refractive index anisotropy varies because alignment in the liquid crystal layer 5 changes in the reflective display area 1b and the transmissive display area 1a.

The external light in the state of clockwise circular polarize light emerging from the circular polarizing plate 4a makes incident on the compensation plate 6a and the liquid crystal layer 5 in the reflective display area 1b. The refractive index anisotropy of the liquid crystal layer 5 is changed because of the applied voltage, so that the polarization state of the clockwise circular polarized light is changed. The clockwise circular polarized light is rotated by one-quarter wavelength and converted to linear polarized light, even though the change amount depends on the applied voltage and the set thickness of the liquid crystal layer 5. The linear polarized light makes incident on the reflective plate 7, but the reflective plate 7 does not change the state of the linear polarized light and emits it as it is, and the light in that state makes incident again on the liquid crystal layer 5 and the compensation plate 6a in the reflective display area 1a.

As in the case of incoming way, the liquid crystal layer 5 and the compensation plate 6a work as a quarter-wavelength plate. Thus, the linear polarized light is converted into the clockwise circular polarized light, and then it makes incident on the polarizing plate 4a. Because the polarizing plate 4a transmits the clockwise circular polarized light, the light emerges and a white display is realized. That is, when a voltage is applied to the pixel electrodes 3a and the common electrode 3b, the display in the reflective display area 1a becomes white.

Further, when the thin film transistor T is in action, light emitted from the backlight 8 for transmissive display makes incident on the circular polarizing plate 4b in the reflective display area 1b, and emerges therefrom as counterclockwise circular polarized light. The emitted light then makes incident on the backside compensation plate 6b, the liquid crystal layer 5, and the compensation plate 6a in this order. However, the refractive index anisotropy of the liquid crystal layer 5 is changed because of the applied voltage, so that the polarization state of the counterclockwise circular polarized light is changed. The counterclockwise circular polarized light is rotated by one-half wavelength to be converted into the clockwise circular polarized light, even though the change amount depends on the applied voltage and the set thickness of the liquid crystal layer. The light in the state of the clockwise circular polarized making incident on the polarizing plate 4a transmits the circular polarizing plate 4a, so that display in the transmissive display area 1b becomes a white display. That is, when a voltage is applied between the pixel electrodes 3a and the common electrode 3b, the display in the transmissive display area 1b becomes white as in the case of the reflective display area 1a.

As described above, the liquid crystal display device of the exemplary embodiment operates as the normally black mode semi-transmission type liquid crystal display device in which the transmissive display area and the reflective display area are driven by the horizontal electric field.

As described above, it is possible with the exemplary embodiment of the present invention to make the insulating layer uniform in the reflective display area by employing a planarizing film for the rough-surface reflecting plate. Further, the use of the metal (opaque electrode) as the comb-shaped electrode can suppress an influence of the diffused reflection from the rough-surface reflective plate imposed upon the insulating layer, so that the patterning accuracy can be improved.

Further, with the first exemplary embodiment of the present invention, it is possible to complete the common electrode 3b, the insulating layer 71, and the pixel electrodes 3a as the laminated body within the reflective display area without adding a new metal layer, with the use of the electrode metal layer of the thin film transistor.

Furthermore, in the first exemplary embodiment of the present invention, the common electrode in the reflective display area is set to a common potential, and the pixel electrode making a pair therewith is connected to the drain electrode of the thin film transistor. With this, an electric field perpendicular to the substrate is generated between the pixel electrode and the common electrode along the action of the thin film transistor to generate an electric field in the liquid crystal layer in an in-face direction of the substrate, thereby rotating the liquid crystal layer within the surface to achieve display.

Further, the pixel electrodes and the common electrode in the reflective display area can be completed in the process of manufacturing the thin film transistor, so that the cost can be reduced.

Furthermore, when no voltage is applied to the pixel electrode and the common electrode so that no potential difference is generated, i.e. in the case of a black display, it is possible to decrease the reflection by the pixel electrode or the common electrode formed with the metal, thereby achieving a fine black display with only a small whitening phenomenon. This is because the liquid crystal layer is made into an isotropic layer in the display surface by the compensation plates in the black display state, and the circular polarizing plates are provided as well. Therefore, the light making incident on the liquid crystal display device from the outside cannot be emitted outside as in the case of the black display state in the reflective display area.

Further, it has been described that the liquid crystal molecules of the liquid crystal display device according to the exemplary embodiment are arranged in parallel alignment by using a general alignment processing. Example of such general alignment processing are a method of applying rubbing processing on an organic film such as polyimide, and a method of obliquely evaporating an inorganic film.

Moreover, the liquid crystal display device of the exemplary embodiment has been so described that the liquid crystal molecules have positive dielectric anisotropy. However, the present invention is not limited to this. Liquid crystal molecules having negative dielectric anisotropy can be used as well. However, since the liquid crystal molecules having negative dielectric anisotropy change the alignment in a direction perpendicular to the electric field direction when a voltage is applied, the primary alignment direction thereof is required to be set in a direction almost parallel to the electric field direction, i.e. required to be set almost in the +Y-axis direction which is rotated by 90 degrees from the direction of the above-described exemplary embodiment in the XY plane. Accordingly, the viewer-side compensation plate 6a and the backside compensation plate 6b also need to be rotated by 90 degrees in the XY plane.

With the liquid crystal display device 1 of the first exemplary embodiment, even the semi-transmission type liquid crystal display device in an IPS mode with comb-shaped parallel electrodes can accomplish an excellent display quality in viewing angles with the use of the circular polarizing plates, through providing the compensation plates with which the refractive index anisotropy in the display surface of the liquid crystal layer in the reflective display area 1a and the transmissive display area 1b is counteracted, which leads both of the transmissive display area and the reflective display area to be in the normally black mode.

The liquid crystal display device 1 of the exemplary embodiment has been so described herein that the refractive index anisotropy in the display surface in the reflective display area 1a and the transmissive display area 1b is completely counteracted by the viewer-side compensation plate 6a and the backside compensation plate 6b. However, the present invention is not limited to this. That is, the compensation degree depends on designs and productions, and the important point is that the refractive anisotropy in the display surface of the liquid crystal layer 5 is decreased by using the compensation plates, and the semi-transmission type liquid crystal display device in an IPS mode is realized by combining the compensation plates with the circular polarizing plates. However, an excellent performance can be achieved in terms of contrast ratios, viewing angles, and the like, when the refractive index anisotropy is counteracted as much as possible.

Further, the exemplary embodiment has been so described that the thickness of the liquid crystal layer 5 in the reflective display area 1a is half the thickness of the liquid crystal layer 5 in the transmissive display area 1b, and the viewer-side compensation plate 6a counteracts the refractive index anisotropy in the display surface of the liquid crystal layer 5 in the reflective display area 1a to provide isotropy, and the backside compensation plate 6b counteracts the refractive index anisotropy in the display surface of the liquid crystal layer 5 in the transmissive display area 1b in cooperation with the viewer-side compensation plate 6a to provide isotropy. However, the present invention is not limited to this, and other thickness condition may be applied. The important thing is that the viewer-side compensation plate 6a counteracts the refractive index anisotropy in the display surface of the liquid crystal layer 5 in the reflective display area 1a, and that the backside compensation plate 6b counteracts the refractive index anisotropy in the display surface of the liquid crystal layer 5 in the transmissive display area 1b in cooperation with the viewer-side compensation plate 6a. However, by setting the thickness of the liquid crystal layer 5 in the reflective display area 1a to be half the thickness of the liquid crystal layer 5 in the transmissive display area 1b as in the exemplary embodiment, the same compensation plate can be utilized for the viewer-side compensation plate 6a and the backside compensation plate 6b. Therefore, it is possible to reduce the cost.

Moreover, the exemplary embodiment has been so described that the alignment direction of the pixel electrodes 3a and the common electrode 3b is the Y-axis direction, and the longitudinal direction thereof is the X-axis direction. However, the present invention is not limited to this. The pixel electrodes and the common electrodes may be arranged diagonally with respect to the X-axis direction, and the diagonal angles may take different values depending on coordinates of the X-axis to be in a multi-domain structure. The multi-domain structure can improve a viewing angle characteristic, when a voltage is applied in particular.

Furthermore, the liquid crystal display device of the exemplary embodiment may include a planarizing layer formed on the comb-shaped pixel electrodes 3a and the comb-shaped common electrode 3b. With this, an influence of the unevenness of the comb-shaped electrodes imposed upon the liquid crystal alignment can be reduced, and the liquid crystal can be aligned more evenly. As a result, the quality can be improved by suppressing variations in the optical characteristic.

In addition, the liquid crystal display device of the exemplary embodiment has been so described that the thickness of the liquid crystal layer 5 varies in the reflective display area 1a and in the transmissive display area 1b. This makes it possible to adjust the gradations in the reflective display and the transmissive display adequately.

As described above, the liquid crystal display device according to the exemplary embodiment of the present invention can be preferably applied to portable terminal apparatuses such as mobile telephones. The portable terminal apparatuses include not only mobile telephones, but also PDAs (Personal Digital Assistants), game machines, digital cameras, digital camcorders, and the like. Further, the liquid crystal display device according to the exemplary embodiment of the present invention can be applied not only to the portable terminal devices, but also to various kinds of terminal apparatuses such as laptop computers, cash dispensers, and vending machines.

Second Exemplary Embodiment

In FIG. 1, the pixel electrodes 3a and the common electrode 3b in the reflective display area 1a are disposed on two different layers that area placed one over another. However, the present invention is not limited to this. A case of disposing the pixel electrodes 3a and the common electrodes 3b in the reflective display area 1a on the same layer will be described as a second exemplary embodiment.

Figure 5:
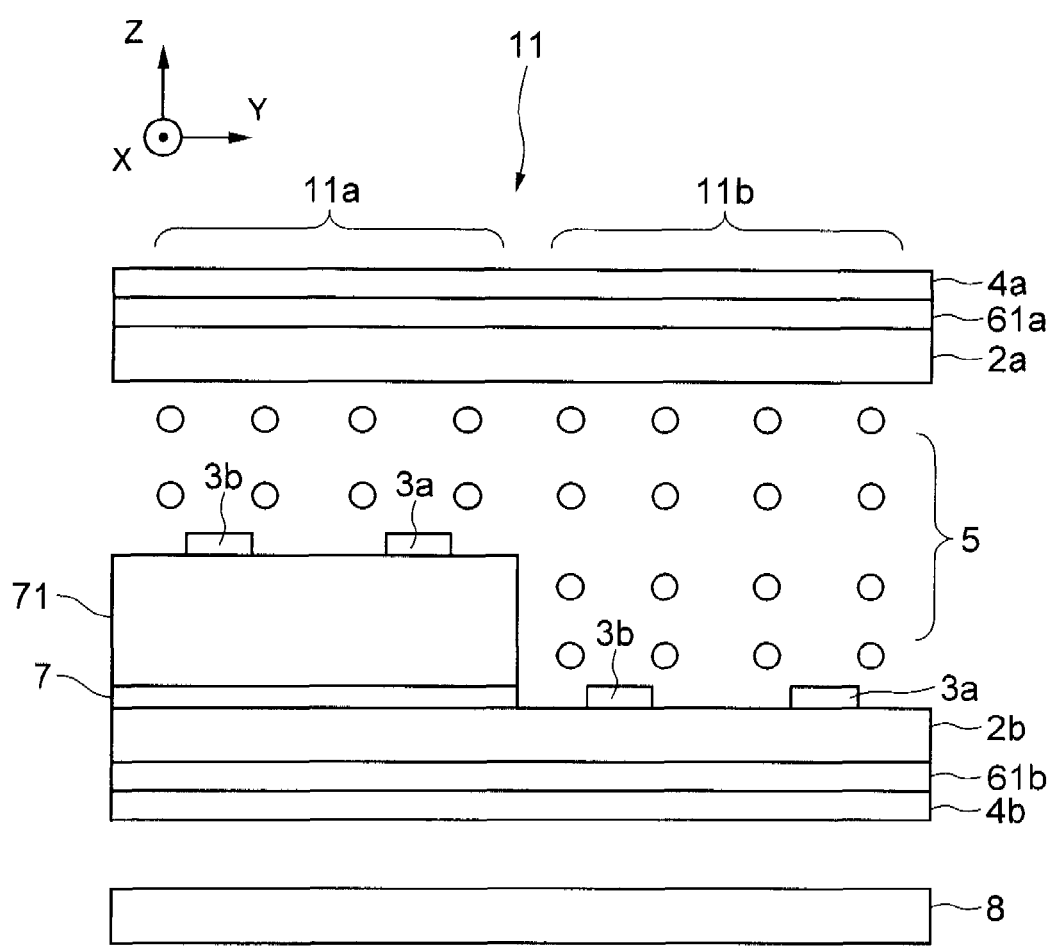
FIG. 5 is a cross-sectional view showing a structure of a liquid crystal display device according to a second exemplary embodiment of the present invention.

As shown in FIG. 5, the second exemplary embodiment includes a reflective display area 11a and a transmissive display area 11b. Although not shown in FIG. 5, a thin film transistor (T) shown in FIG. 1 is formed in the transmissive display area 11b of FIG. 5.

Further, as shown in FIG. 5, the second exemplary embodiment has a reflective film 7 formed on a substrate 2b in the reflective display area 11a by using the same metal layer as that of a gate electrode G of the thin film transistor (T). Furthermore, pixel electrodes 3a and common electrodes 3b are formed on an insulating layer 71 of the reflective display area 11a by using the same metal layer as that of a drain electrode (D) of the thin film transistor (T). That is, plane layout of the exemplary second exemplary embodiment is changed from that of the first exemplary embodiment shown in FIG. 1, in which the reflective film 7 and the common electrodes 3b are formed separately, and the pixel electrodes 3a and the common electrodes 3b are formed on the insulating layer 71. In this case, potential of the reflective plate 7 is set to be the same as that of the common electrode 3b. The pixel electrodes 3a and the common electrodes 3 may be formed with the same metal layer as that of a source electrode of the thin film transistor (T).

Further, in FIG. 5, a compensation plate 61a is used instead of the compensation plate 6a of FIG. 1, and a compensation plate 61b is used instead of the compensation plate 6b. The compensation plate 61a and the compensation plate 61b are retardation films of positive A plates, and extraordinary directions of the refractive index are set to be orthogonal to an alignment direction of liquid crystal molecules in a liquid crystal layer 5. That is, an A axis is in a direction rotated by 15 degrees from +X direction towards −Y direction in an XY plane.

Further, when no voltage is applied to the pixel electrodes 3a and the common electrodes 3b, a retardation value of the compensation plate 61a is set to be in a value with which retardation in a display surface of the liquid crystal layer 5 in the reflective display area 11a is counteracted to provide optical isotropy. Furthermore, when no voltage is applied to the pixel electrodes 3a and the common electrodes 3b, a retardation value of the compensation plate 61b is set in a value with which retardation of the liquid crystal layer 5 in the transmissive display area 11b is counteracted in cooperation with the compensation plate 61a to provide optical isotropy.

Compared to the liquid crystal display device 1 shown in FIG. 1, the liquid crystal display device 11 shown in FIG. 5 is inferior in a viewing angle characteristic because the retardation value thereof in the XY plane is larger than the retardation value in the Z-axis direction. However, an often-used retardation plate of positive A plate can be utilized as the compensation plate, so that the cost can be reduced.

Further, with the second exemplary embodiment of the present invention, a capacitance between the pixel electrodes 3a and the common electrodes 3b is increased, and it can be utilized as so-called a storage capacity. Furthermore, in the second exemplary embodiment of the present invention, an electric field for rotating the liquid crystal molecules in an in-face direction in the liquid crystal layer 5 is generated due to the electric field generated between the pixel electrodes 3a and the common electrodes 3b, thereby achieving a display operation. The second exemplary embodiment of the present invention forms the pixel electrodes, the common electrodes, and the reflective plate by using the electrode metal layer of the thin film transistor. Therefore, in addition to the effects described above, the second exemplary embodiment can achieve the same effects as those of the first exemplary embodiment shown in FIG. 1.

Third Exemplary Embodiment

Figure 6:
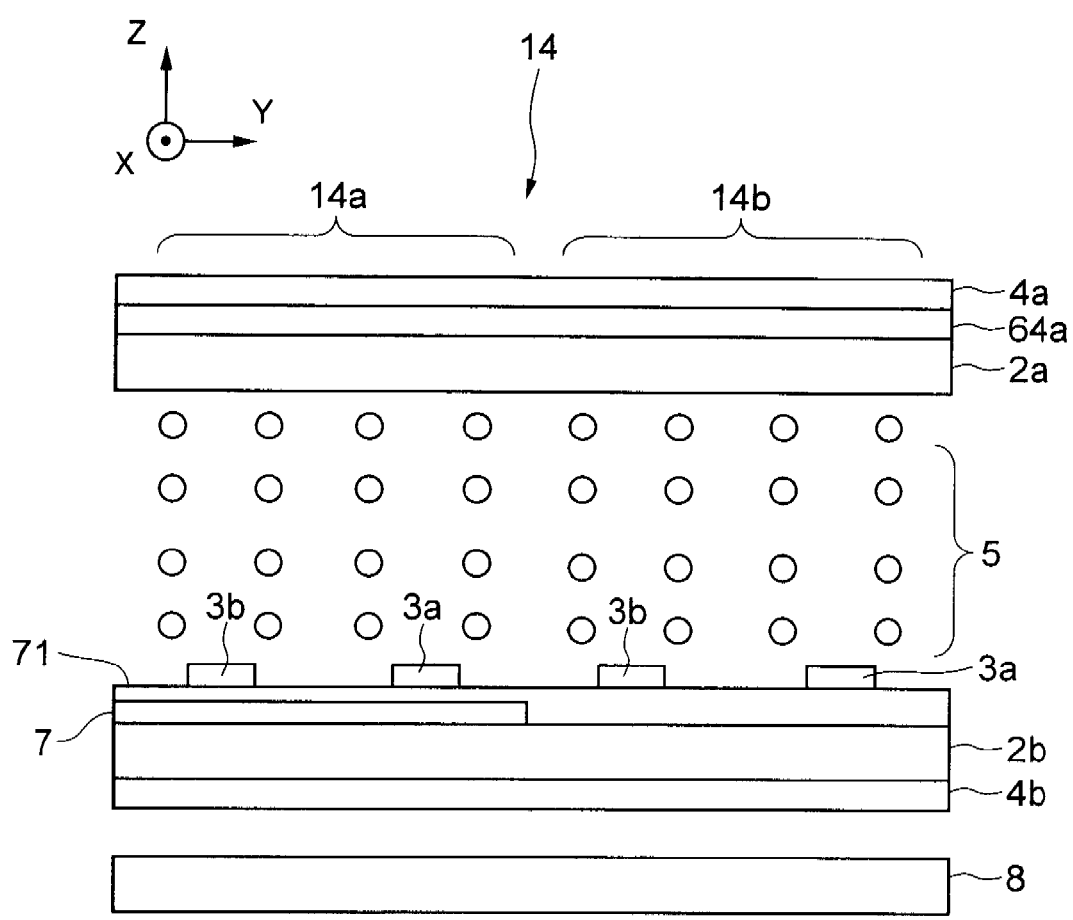
FIG. 6 is a cross-sectional view showing a structure of a liquid crystal display device according to a third exemplary embodiment of the present invention.

Next, a third exemplary embodiment of the present invention will be described. A liquid crystal display device 14 shown in FIG. 6 is a modification of the liquid crystal display device 11 shown in FIG. 5. In FIG. 6, the same reference numerals are applied to the structural components that are the same as those of the second exemplary embodiment shown in FIG. 5.

In the liquid crystal display device 14 of the third exemplary embodiment shown in FIG. 6, pixel electrodes 3a and common electrodes 3b in a reflective display area 14a and a transmissive display area 14b are formed by using the same metal layer as that of a drain electrode (D) or a source electrode (S) of a thin film transistor (T: see FIG. 1) that is formed on the transmissive display area 1b. Further, a reflective plate 7 is formed with the same metal layer as that of a gate electrode (G) of the thin film transistor (T: see FIG. 1) that is formed on the transmissive display area 1b.

The third exemplary embodiment of the present invention forms the pixel electrodes, the common electrodes, and the reflective plate by using the electrode metal layer of the thin film transistor, so that it can achieve the same effects as those of the first exemplary embodiment shown in FIG. 1.

Further, the thickness of the liquid crystal layer 5 in the reflective display area 14a and that of the liquid crystal layer 5 in the transmissive display area 14b are the same, a compensation plate 64a is provided, and the other compensation plate is omitted. For the compensation plate 64a, a retardation film of negative A plate is used. When no voltage is applied to the pixel electrodes 3a and the common electrodes 3b, a retardation value of the compensation plate 64a is set to counteract refractive index anisotropy in a display surface of the liquid crystal layer 5 of the transmissive display area 14b so as to provide optical isotropy. Because the thickness of the liquid crystal layer 5 in the transmissive display area 14b and that of the liquid crystal layer 5 in the reflective display area 14a are the same, when the refractive index anisotropy of the liquid crystal layer 5 is counteracted in the transmissive display area 14b, the refractive index anisotropy of the liquid crystal layer 5 in the reflective display area 14a is also counteracted.

With the liquid crystal display device 14 of the exemplary embodiment, it is required to apply different drive voltages to the reflective display area 14a and the transmissive display area 14b in order to adjust gradations between the reflective display area and the transmissive display area. However, the other compensation plate can be omitted, so that it is possible to reduce the cost and to prevent characteristic variations caused due to an increase in the number of films.

Further, in order to apply different voltages between the reflective display area and the transmissive display area, it is also possible to reduce an effective electric field by forming an insulating layer on the electrodes in the reflective display area. Furthermore, the effective electric field in the reflective display area can be reduced by setting pitches between the comb-shaped pixel electrodes and common electrodes in the reflective display area wider than pitches of the comb-shaped pixel electrodes and common electrodes in the transmissive display area.

When the thickness of the liquid crystal layer varies in the reflective display area and the transmissive display area due to the laminar structure, it is preferable to determine a retardation value of the viewer-side compensation plate according to the thickness of the liquid crystal layer in the transmissive display area by giving priority to the transmissive display performance. It is because the transmissive display performance has priority over the reflective display performance in general.

Further, in the third exemplary embodiment of the present invention, the pixel electrodes 3a and common electrodes 3b in the reflective display area 14a and the transmissive display area 14b are formed by using the same metal layer as that of the drain electrode (D) or the source electrode (S) of the thin film transistor (T: see FIG. 1) that is formed on the transmissive display area 1b, and the reflective plate 7 is formed with the same metal layer as that of the gate electrode (G) of the thin film transistor (T: see FIG. 1) that is formed on the transmissive display area 1b. Therefore, it is possible to achieve the same effects as those of the first exemplary embodiment.

Fourth Exemplary Embodiment

Figure 7:
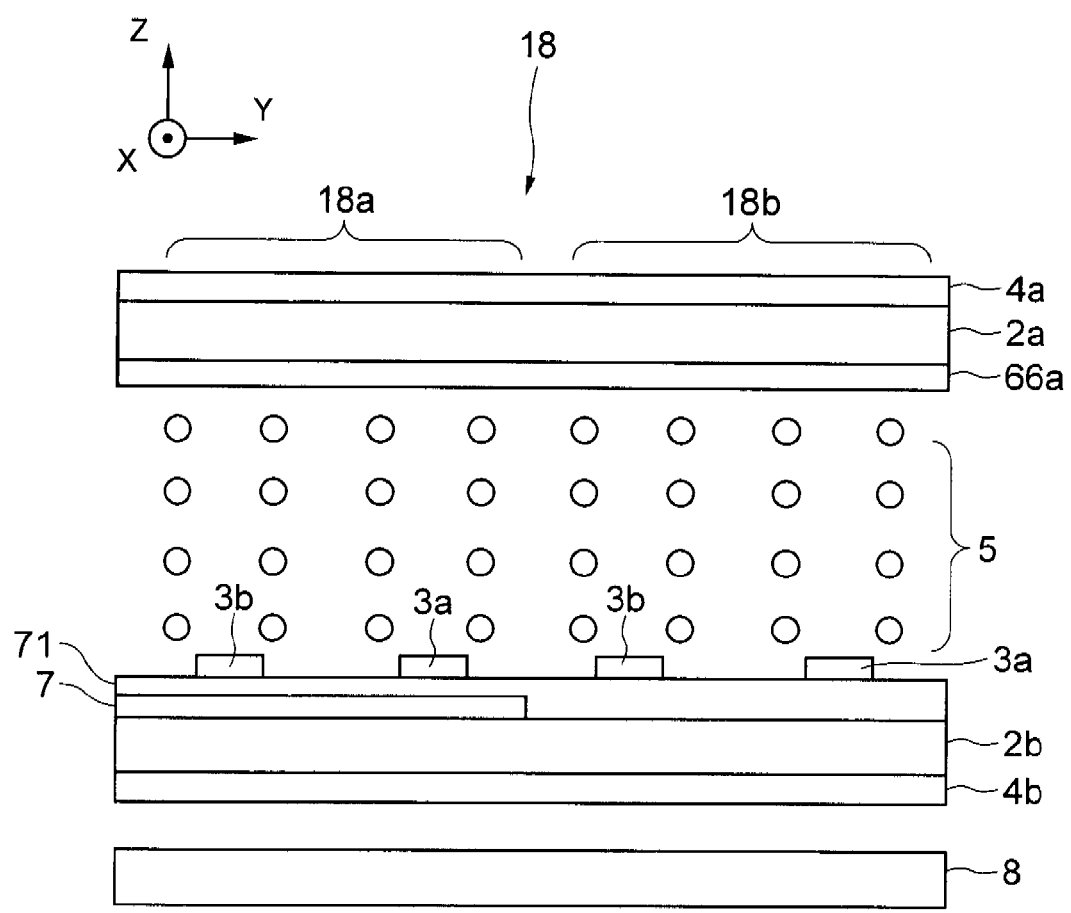
FIG. 7 is a cross-sectional view showing a structure of a liquid crystal display device according to a fourth exemplary embodiment of the present invention.

Next, a fourth exemplary embodiment of the present invention will be described by referring to FIG. 7. A liquid crystal display device 18 shown in FIG. 7 is a modification of the liquid crystal display device 14 shown in FIG. 6. In FIG. 7, the same reference numerals are applied to the structural components that are the same as those of the third exemplary embodiment shown in FIG. 6.

The liquid crystal display device 18 according to the fourth exemplary embodiment shown in FIG. 7 uses a compensation layer 66a, and the compensation layer 66a is formed on a liquid crystal layer 5 side of a viewer-side substrate 2a. That is, it is a distinctive feature of this exemplary embodiment to employ so-called an in-cell type compensation layer, in which a compensation layer is disposed on the liquid crystal layer side of the substrate, as a compensator for reducing the refractive index anisotropy of the liquid crystal layer within the display surface. Further, it is also a feature of this exemplary embodiment that the compensation layer is formed in the viewer-side substrate. In particular, it is a feature of the exemplary embodiment to form only the compensation layer for reducing the refractive index anisotropy of the liquid crystal layer within the display surface into an in-cell type, and to employ a conventional structure for the circular polarizing plate. As a way of example, the compensation layer of the exemplary embodiment can be achieved through polymerization by performing alignment processing of liquid crystal monomers. In addition, the compensation layer 66a is formed in a structure of negative A plate. Reference numeral 18a is a reflective display area and 18b is a transmissive display area.

The fourth exemplary embodiment of the present invention forms the pixel electrodes, the common electrodes, and the reflective plate by using the electrode metal layer of the thin film transistor, so that it can achieve the same effects as those of the first exemplary embodiment shown in FIG. 1.

The basic operation of the fourth exemplary embodiment is the same as that of the above-described third exemplary embodiment. However, an additional effect can be achieved with the use of the in-cell type compensation layer. That is, in order to reduce the refractive index anisotropy of the liquid crystal layer within the display surface with the above-described third exemplary embodiment, it is necessary to improve the axial precision between the alignment direction of the liquid crystal molecules in the liquid crystal layer and the viewer-side compensation plate. The reason for this is that if the axial precision is poor, the alignment direction of the liquid crystal and the axial direction of the compensation plate become shifted from each other, thereby deteriorating the compensating performance. Further, as in the third exemplary embodiment, when the compensator is laminated as a compensation plate on the outer side, i.e. laminated on the opposite side from the liquid crystal layer of the viewer-side substrate, a complicated manufacture process control is required for reducing the shift. It is because there are emerged a large number of control items such as controlling the angle margins when cutting out compensation plates from a raw material, controlling the angle margins when laminating the compensation plate to the viewer-side substrate, etc.

On the contrary, when the compensation layer is formed into an in-cell type as in the fourth exemplary embodiment, the axis of the compensation layer can be controlled by employing the alignment method of the liquid crystal layer. Therefore, high axial precision can be achieved with the minimum control. Further, it is possible to arrange the compensation layer closely to the liquid crystal layer, so that a high-quality display can be achieved by reducing the disturbance of the polarized light.

Meanwhile, the circular polarizing plate has a larger margin for the axial shift compared to the compensator. That is, the circular polarizing plate that has a larger margin is preferable to be placed on the outer side. In particular, when the polarizing plate is formed into an in-cell type, there are more existing issues to be overcome than the case of forming the compensator into an in-cell type, such as securing the high degree of polarization, liquid crystal panel process resistance, preventing liquation of impurities to the liquid crystal layer, etc. Therefore, the polarizing plate is formed into a circular polarizing plate to secure the axial margin and laminated on the outer side, and the compensator is formed into an in-cell type. With this, it is possible to achieve both an excellent characteristic and low cost.

As described, it is an important concept of this exemplary embodiment to form the compensator into an in-cell type, and the compensator can employ not only the negative A plate structure but also the structures depicted in other exemplary embodiments. As has been described that it is the important concept to form the compensator into an in-cell type, it is more preferable to form the one for compensating the refractive index anisotropy of the liquid crystal layer within the display surface into an in-cell type, among those compensators.

Further, compared to the case as in the first exemplary embodiment of the present invention described above where the compensator is provided on both sides of the two substrates, the number of compensation layers can be reduced from two layers to a single layer. Therefore, it is preferable since the cost can be reduced.

With the in-cell type compensator, reflection due to a metal electrode can be suppressed even when a metal pixel electrode or metal common electrode is formed on the viewer-side substrate, thereby allowing a high contrast to be provided. It is because there is no liquid crystal layer and no compensation layer interposed between the metal electrode and the circular polarizing plate. Thus, the polarization direction of the light emitted from the circular polarizing plate when reflected by the metal electrode becomes orthogonal, so that the light cannot be emitted from the circular polarizing plate. Operations and effects of the fourth exemplary embodiment other than those described above are the same as the ones of the third exemplary embodiment described above.

Fifth Exemplary Embodiment

Figure 8:
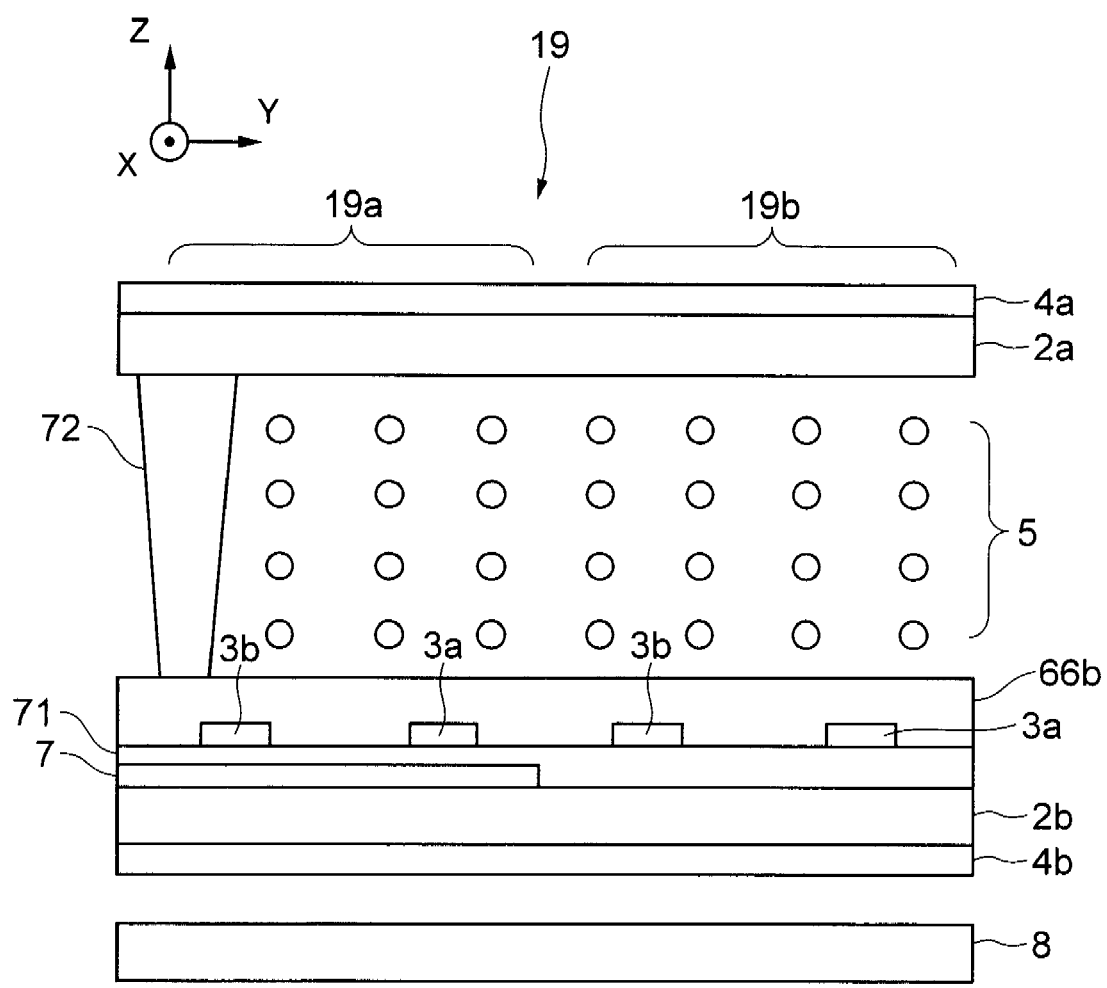
FIG. 8 is a cross-sectional view showing a structure of a liquid crystal display device according to a fifth exemplary embodiment of the present invention.

Next, a fifth exemplary embodiment of the present invention will be described A liquid crystal display device 19 shown in FIG. 8 is a modification of the liquid crystal display device 18 shown in FIG. 7. In FIG. 8, the same reference numerals are applied to the structural components that are the same as those of the second exemplary embodiment shown in FIG. 7.

As shown in FIG. 8, the liquid crystal display device 19 according to the fifth exemplary embodiment uses a backside compensation layer 66*b* instead of using the compensation layer 66*a*, and the compensation layer 66*b* is formed on a liquid crystal layer 5 side of a substrate 2*b*. The compensation layer 66*b* is equivalent to the compensation layer 66*a* described above. In a substrate 2*a*, there is formed a columnar-type spacer 72 for keeping the thickness of the liquid crystal layer 5 to a proper value through keeping the space between the substrate 2*a* and the substrate 2*b* to a proper value. As a way of example, the columnar-type spacer can be fabricated through a known process such as photolithography by using a photosensitive material. As described, this exemplary embodiment is distinctive in respect that an in-cell type compensation layer is formed on the backside substrate side, and a columnar-type spacer is formed in the viewer-side substrate that opposes to the substrate where the compensation layer is formed. Reference numeral 19*a* is a reflective display area and 19*b* is a transmissive display area.

The fifth exemplary embodiment of the present invention forms the pixel electrodes, the common electrodes, and the reflective plate by using the electrode metal layer of the thin film transistor, so that it can achieve the same effects as those of the first exemplary embodiment shown in FIG. 1.

Through the use of the columnar-type spacer, the thickness of the liquid crystal layer can be made more even in this exemplary embodiment. Therefore, the refractive index anisotropy of the liquid crystal layer within the display surface can be reduced with still higher precision by the use of the compensation layer. As a result, it is possible to obtain a high contrast level and to widen the viewing angles. Further, compared to the case of using a spheric-type spacer, it is not only possible to suppress the disturbance in the alignment of the liquid crystal layer caused due to the spheric-type spacer to achieve a high-quality picture, but also possible to prevent the spheric-type spacer from being sunk into the in-cell type compensation layer to improve the uniformity of the gap, i.e. to improve the uniformity in the thickness of the liquid crystal layer. This is because it is difficult to control the sink-in degree of the in-cell type compensation layer or the like for a relatively soft member, due to the shape of the spheric-type spacer. When the columnar-type spacer is used, however, it is possible to provide a larger area in a top part compared to the case of the spheric-type spacer. Therefore, it is possible to control the sink-in of the spacer and to improve the controllability of the gap.

Further, since the columnar-type spacer and the in-cell type compensation layer are provided on the substrates opposing to each other in this exemplary embodiment, the alignment characteristic of the in-cell type compensation layer can be improved. Therefore, it is possible to improve the display quality such as achieving a high contrast level. It is because the alignment of the compensation layer is disturbed by the columnar-type spacer, if the in-cell compensation layer is formed after forming the columnar-type spacer. Meanwhile, if the in-cell type compensation layer is formed before forming the columnar-type spacer, the alignment of the in-cell type compensation layer is disturbed in the manufacture process of the columnar-type spacer. As described, when forming the compensation layer in particular, it is preferable to form the columnar-type spacer on a different substrate from the substrate where the in-cell type compensation layer is provided.

Furthermore, it is preferable that the substrate to provide the columnar-type spacer be the viewer-side substrate 4*a*. In the viewer-side substrate, a light shielding layer is formed for concealing the wirings and boundary areas between the neighboring pixels. The light shielding layer is formed thicker than the wirings and the like. That is, it is possible to shield the light securely through providing the light shielding layer, which is thicker than the targets to be concealed, on the viewer side. Further, by forming the columnar-type spacer in the viewer-side substrate where the light shielding layer is formed, it is possible to arrange the columnar-type spacer by securely aligning it with the light shielding layer. As a result, a high picture quality can be achieved, since the columnar-type spacer is not visually recognized by the user even if there is a position shift generated when assembling the viewer-side substrate and the backside substrate.

As described, it is preferable to use the columnar-type spacer as a gap retainer when the refractive index anisotropy of the liquid crystal layer within the display surface is compensated by the in-cell type compensation layer. From the view point of improving the display quality, it is preferable to form the columnar-type spacer in the viewer-side substrate and to form the in-cell type compensation layer in the backside substrate.

The backside compensation layer is provided on the liquid crystal layer side than the pixel electrode or common electrode in this exemplary embodiment, however, the present invention is not limited to this. It is possible to provide the backside compensation layer on the backside substrate 2b side than the pixel electrode or the common electrode to reduce the drive voltage. This is because drop of the voltage applied to the liquid crystal layer can be prevented with the compensation layer.

Sixth Exemplary Embodiment

Figure 9:
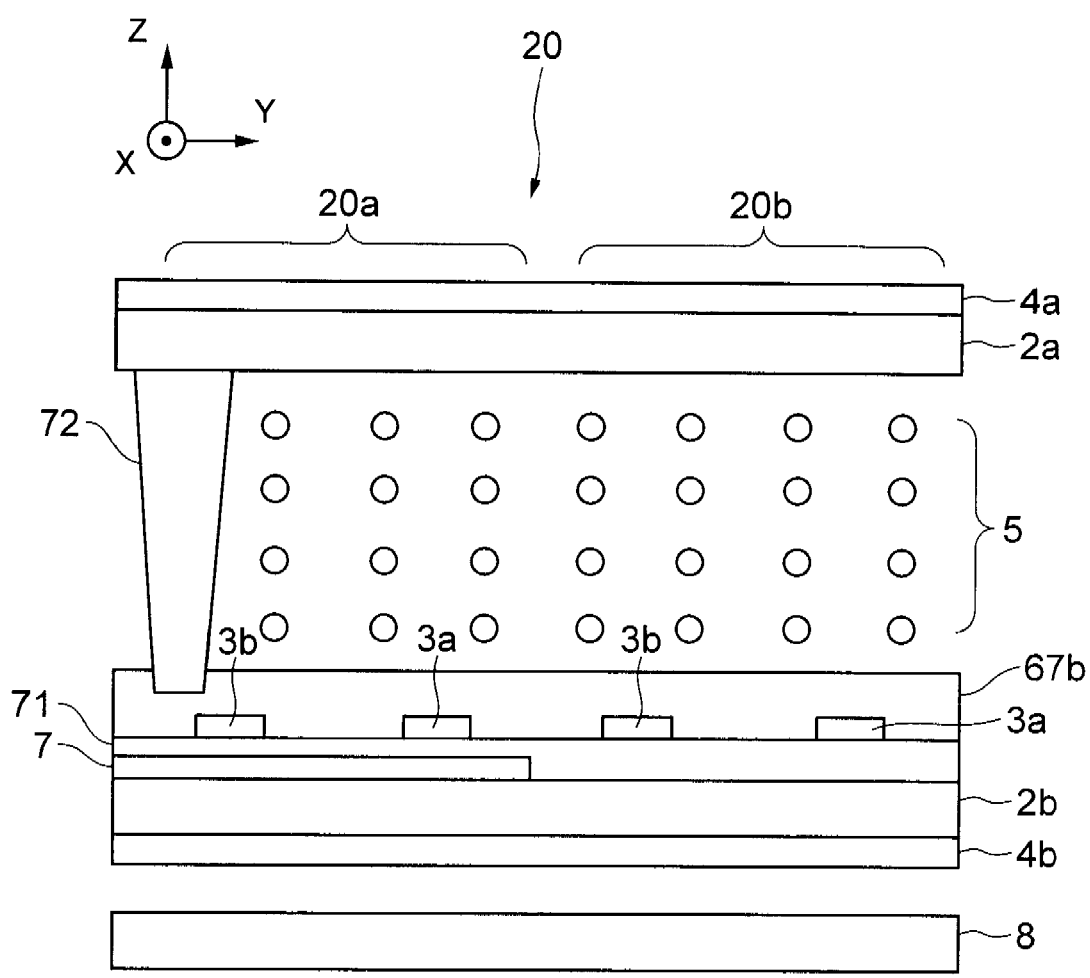
FIG. 9 is a cross-sectional view showing a structure of a liquid crystal display device according to a sixth exemplary embodiment of the present invention.
Figure 10A:
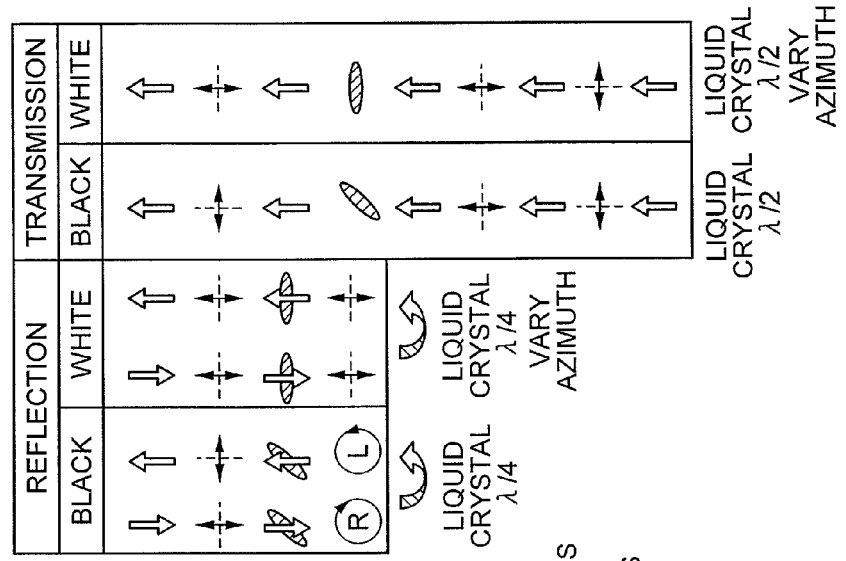
FIG. 10 is a view showing a frame format of an optical configuration, arranged angles, and operations of a semi-transmission type liquid crystal panel in an IPS (In-plane-switching) mode used for a liquid crystal display device depicted in Patent Document 1.
Figure 10B:
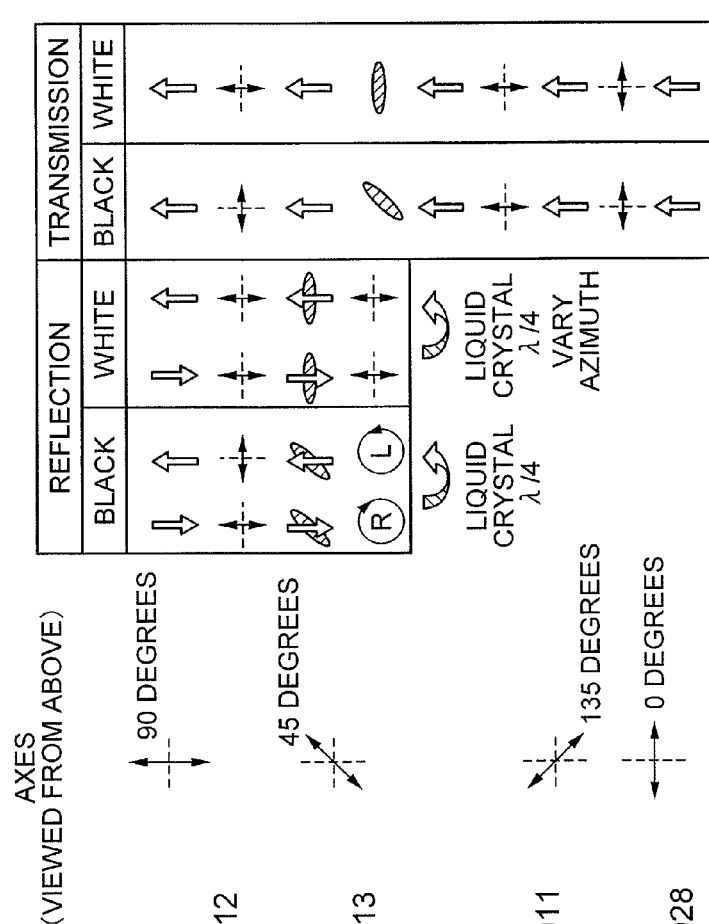
Figure 10C:
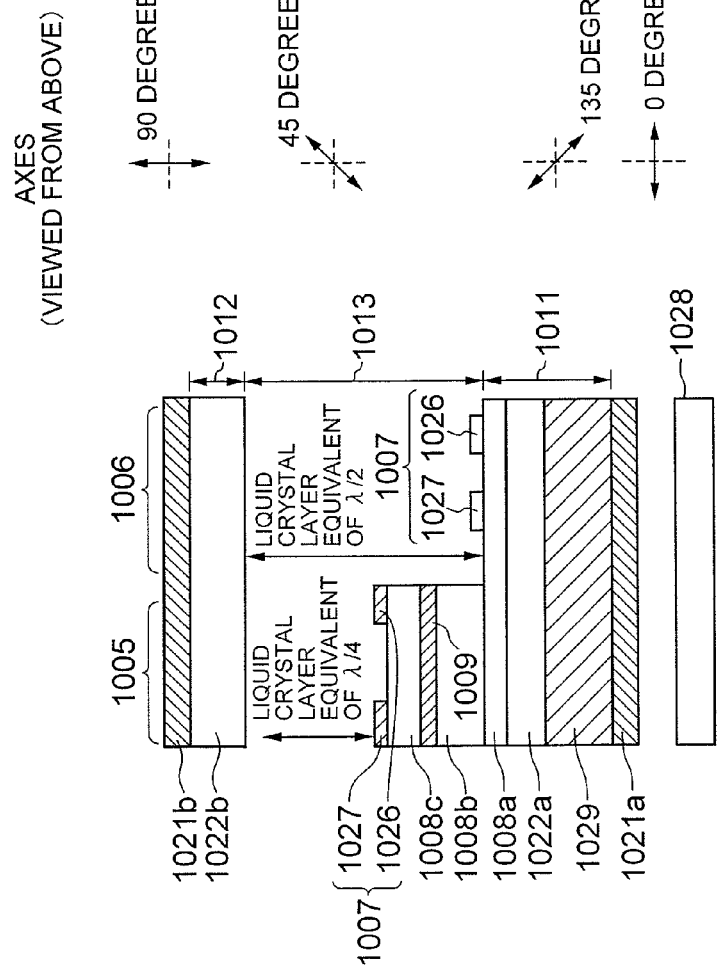
Figure 11:
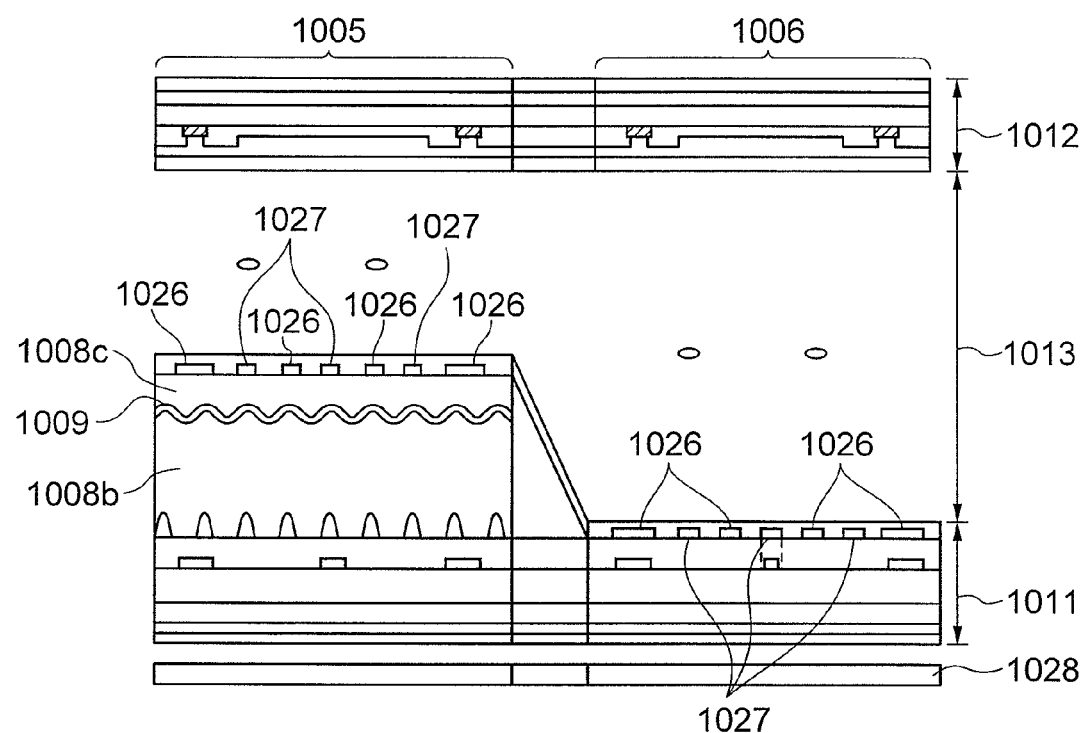
FIG. 11 is a cross-sectional view showing a semi-transmission type liquid crystal panel in an IPS mode used for a liquid crystal display device depicted in Patent Document 1.

Next, a sixth exemplary embodiment of the present invention will be described. As shown in FIG. 9, a liquid crystal display device 20 according to the sixth exemplary embodiment uses a compensation layer 67b, unlike the liquid crystal display device 19 according to the fifth exemplary embodiment described above. The compensation layer 67b is lower in the hardness compared to the compensation layer 66b of the fourth exemplary embodiment described above, and it is configured such that the sink-in amount of the columnar-type spacer 72 into the compensation layer 67b can be controlled at the time of manufacture. Reference numeral 20a is a reflective display area and 20b is a transmissive display area.

Next, there will be described a method for manufacturing the display device according to the sixth exemplary embodiment. For distinctively clarifying differences of the manufacturing method according to this exemplary embodiment, an already-known manufacturing method will be described.

With the already-known manufacturing method, as depicted in the aforementioned exemplary embodiment, for example, a columnar-type spacer is formed in the viewer-side substrate, and it is then aligned and laminated with the backside substrate. Then, a prescribed pressure is applied to set the space between the both substrates, i.e. the gap, to be a proper value. In this case, if there is a distribution in the height of the columnar-type spacer within the display surface, for example, it is reflected upon the gap value as well. Thus, there is generated unevenness in the gap within the surface. The reason for this is that the structural members such as the columnar-type spacer for providing the space and the surrounding members thereof do not change their shapes. Thus, when there is generated unevenness within the surface of the structural members, the difference thereof is reflected as a difference in the gap. In the case where the optical compensation is achieved through the use of the compensation plate and the compensation layer as in the present invention, compensation cannot be achieved sufficiently if the retardation value of the liquid crystal layer to be compensated, i.e. a value obtained through multiplying the thickness of the liquid crystal layer to the refractive index anisotropy of the liquid crystal molecule, is not set within a specific range. In the area where the compensation is not achieved sufficiently, the refractive index anisotropy of the liquid crystal layer in the display surface cannot be compensated with high precision. Thus, the transmittance of black is not decreased sufficiently, which results in causing an excessive whitening phenomenon and deterioration in the contrast ratio. Furthermore, when the contrast ratio is decreased, the viewing angle characteristic is decreased as well. This is because the index showing the viewing angle characteristic depends largely on the contrast ratio and, when the contrast ratio of the front face is decreased, the contrast ratio of the oblique direction is deteriorated as well. As a result, the range of angles that can achieve a prescribed contrast ratio is narrowed. As described, deterioration in the compensation precision causes deterioration in the display quality. Especially, unevenness is generated in the compensation precision when there is unevenness generated in the gap within the display surface, which results in more deterioration in the display quality.

For this, with the manufacturing method of the display device according to the sixth exemplary embodiment, the compensation layer 67b is formed in a substrate 2b, and the columnar-type spacer 72 is formed in a substrate 2a. At this time, hardness of the compensation layer 67b, hardness of the columnar-type spacer 72, and the density of the columnar-type spacer 72 are set such that the columnar-type spacer 72 can be sunk into the compensation layer 67b. After laminating and aligning the two substrates, a prescribed pressure is applied to set the space between both substrates, i.e. the gap, in a proper value. At this time, a device for applying the pressure to both substrates is configured to be capable of detecting the gap between the both substrates within the display area at a plurality of areas. Further, it is configured to be capable of applying pressures of different values in the vicinity of the measured areas. Therefore, when the height of the columnar-type spacer 72 is not uniform, the device for applying the pressure to both substrates increases the pressure for the area with a large gap, upon detecting such area. Upon this, the columnar-type spacer in this area is sunk into the backside compensation layer. Thus, the gap can be made smaller and the difference in the gap within the surface can be decreased. With this, retardation of the liquid crystal layer within the display surface can be made uniform, so that the optical compensation by the compensator can be achieved as designed and deterioration of the display quality can be suppressed. It is a characteristic structure of the display device manufactured in this manner that there exits an area where the columnar-type spacer is sunk into the compensation layer.

It is also possible to control the gap to be uniform by setting the height of the columnar-type spacer 72 to be larger than the gap, and applying a large pressure over the entire display surface to make the columnar-type spacer sink into the compensation layer in the entire display surface. In this case, such phenomenon of fluctuation in the gap within the surface can be suppressed even when a pressure, oscillation, or stress is applied to the display device after the manufacture. Therefore, the display quality can be improved and the improved quality can be maintained. That is, it is desirable that matching between the liquid crystal layer and the compensator be secured and the matching state be not changed due to some reasons. For the liquid crystal layer, it is desirable to be configured such that there is no change generated in the thickness thereof.

This exemplary embodiment is so configured that the columnar-type spacer formed in the viewer-side substrate sinks into the backside compensation layer formed in the backside substrate. However, the present invention is not limited to this. As a way of example, in the case such as the above-described first and third exemplary embodiments where the compensator is provided as a compensation plate, it is possible to achieve the same effects by additionally providing a soft layer where the columnar-type spacer can be sunk in. In this case, this soft layer is not necessarily formed over the entire surface of the backside substrate. It is enough to be formed only in the part that opposes to the columnar-type spacer. As another example, the columnar-type spacer itself may be formed to change its shape. In this case, the material for forming the columnar-type spacer may be changed to a soft material, or it is also effective to reduce the in-plane density of the columnar-type spacer. Further, it is also effective to increase a pressure applied to both substrates at the time of manufacture. In such case where the columnar-type spacer itself is formed to change its shape, the stress resistance is deteriorated compared to other cases where the spacer sinks in. However, a certain degree of resistance can be secured, since the liquid crystal layer itself has an effect of preventing swelling of the gap. It is unnecessary to form a layer for the columnar-type spacer to sink in, so that this case is preferable when a compensator is not provided on the liquid crystal layer side of the substrate.

Further, liquid crystals may be dropped before the viewer-side substrate and the backside substrate are laminated. This is preferable since it is possible to detect not only the gap between the substrates but also the retardation of the liquid crystal layer.

As described above, in this exemplary embodiment, the columnar-type spacer or the compensator is configured to be able to correct the thickness of the liquid crystal layer. With this, unevenness in the thickness of the liquid crystal layer within the display surface can be made uniform, and matching state with the compensator can be made highly precise to achieve a high display quality.

Further, through the constitution for allowing suppression of such phenomenon that the thickness of the liquid crystal layer is fluctuated due to some external or internal reasons (e.g. sink-in of the columnar-type spacer to the compensation layer), the achieved high-quality can be maintained for a long period of time. Operation and effects of this exemplary embodiment other than those described above are the same as the ones of the fifth exemplary embodiment described above.

The sixth exemplary embodiment of the present invention forms the pixel electrodes, the common electrodes, and the reflective plate by using the electrode metal layer of the thin film transistor, so that it can achieve the same effects as those of the first exemplary embodiment shown in FIG. 1.

Each of the above-described embodiments can be carried out by itself or can be carried out in combinations as necessary.

The present invention can be utilized suitably for display devices of portable terminal devices such as mobile telephones, PDAs (Personal Digital Assistant), game machines, digital cameras, camcorders, and video players, and for display devices of terminal devices such as laptop computers, cash dispensers, and vending machines.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A liquid crystal display device comprising:
a pair of opposing substrates;
a liquid crystal layer provided between the pair of opposing substrates; and
a plurality of pixels provided in one of the pair of substrates, each one of the plurality of pixels having a reflective display area and a transmissive display area therein, the reflective display area achieving display by reflection of light, and the transmissive display area achieving display by transmission of light,
wherein a laminated body including a reflective plate, an insulating layer, and an opaque metal electrode for rotating liquid crystal molecules of the liquid crystal layer within a surface thereof is provided within the reflective display area,
the opaque metal electrode within the reflective display area is a common electrode or a pixel electrode,
the reflective display area has the reflective plate provided between a substrate on which the reflective plate is formed and the metal electrode,
opaque metal electrodes for rotating the liquid crystal molecules of the liquid crystal layer within a surface thereof are provided within the transmissive display area,
the opaque metal electrodes within the transmissive display area include a common electrode and a pixel electrode, and
the pixel electrode and the common electrode in the transmissive display area are respectively formed in a comb-like shape, and the electrodes are disposed alternately in a same layer.

2. The liquid crystal display device as claimed in claim 1, wherein the metal electrode is formed with a same layer as one of metal layers which configure a gate electrode, a drain electrode, or a source electrode of a thin film transistor that is formed in the transmissive display area within the pixel.

3. The liquid crystal display device as claimed in claim 1, wherein a thickness of the liquid crystal layer varies in the reflective display area and in the transmissive display area.

4. The liquid crystal display device as claimed in claim 1, wherein a thickness of the liquid crystal layer is identical in the reflective display area and in the transmissive display area.

5. The liquid crystal display device as claimed in claim 1, wherein intensity of an electric field for driving the liquid crystal layer varies in the reflective display area and in the transmissive display area.

6. The liquid crystal display device as claimed in claim 1, wherein intensity of an electric field for driving the liquid crystal layer is weaker in the reflective display area than in the transmissive display area.

7. The liquid crystal display device as claimed in claim 1, wherein a pitch between electrodes for generating an electric field in the reflective display area is wider than a pitch between electrodes for generating an electric field in the transmissive display area.

8. The liquid crystal display device as claimed in claim 1, wherein the reflective plate has a rough surface that diffusely reflects incident light.

9. A liquid crystal display device comprising:
a pair of opposing substrates;
a liquid crystal layer provided between the pair of opposing substrates; and
a plurality of pixels provided in one of the pair of substrates, each one of the plurality of pixels having a reflective display area and a transmissive display area therein, the reflective display area achieving display by reflection of light, and the transmissive display area achieving display by transmission of light, wherein a laminated body including a reflective plate, an insulating layer, and an opaque metal electrode for rotating liquid crystal molecules of the liquid crystal layer within a surface thereof is provided within the reflective display area, the reflective plate within the reflective display area is a common electrode or a pixel electrode, the reflective display area has the reflective plate provided between a substrate on which the reflective plate is formed and the metal electrode, opaque metal electrodes for rotating the liquid crystal molecules of the liquid crystal layer within a surface thereof are provided within the transmissive display area, the opaque metal electrodes within the transmissive display area include a common electrode and a pixel electrode, and the pixel electrode and the common electrode in the transmissive display area are formed in a comb-like shape alternately in a same layer.

10. A liquid crystal display device comprising:

a pair of opposing substrates;

a liquid crystal layer provided between the pair of opposing substrates; and a plurality of pixels provided in one of the pair of substrates, each one of the plurality of pixels having a reflective display area and a transmissive display area therein, the reflective display area achieving display by reflection of light, and the transmissive display area achieving display by transmission of light, wherein a laminated body including a reflective plate, an insulating layer, and an opaque metal electrode for rotating liquid crystal molecules of the liquid crystal layer within a surface thereof is provided within the reflective display area, the opaque metal electrode within the reflective display area includes a common electrode and a pixel electrode, the reflective display area has the reflective plate provided between a substrate on which the reflective plate is formed and the metal electrode, opaque metal electrodes for rotating the liquid crystal molecules of the liquid crystal layer within a surface thereof are provided in the transmissive display area, the opaque metal electrodes within the transmissive display area include a common electrode and a pixel electrode, and the pixel electrode and the common electrode in the transmissive display area are formed in a comb-like shape, and the electrodes are disposed alternately in a same layer.

11. A liquid crystal display device comprising:

a pair of opposing substrates;

a liquid crystal layer provided between the pair of opposing substrates; and a plurality of pixels provided in one of the pair of substrates, each one of the plurality of pixels having a reflective display area and a transmissive display area therein, the reflective display area achieving display by reflection of light, and the transmissive display area achieving display by transmission of light, wherein a laminated body including a reflective plate, an insulating layer, and an opaque metal electrode for rotating liquid crystal molecules of the liquid crystal layer within a surface thereof is provided within the reflective display area, the opaque metal electrode within the reflective display area includes a common electrode and a pixel electrode, the reflective plate is a rough-surface reflective plate, the reflective display area has the reflective plate provided between a substrate on which the reflective plate is formed and the metal electrode, opaque metal electrodes for rotating the liquid crystal molecules of the liquid crystal layer within a surface thereof are provided in the transmissive display area, the opaque metal electrodes within the transmissive display area include a common electrode and a pixel electrode, and the pixel electrode and the common electrode in the transmissive display area are formed in a comb-like shape, and the electrodes are disposed alternately in a same layer.

* * * * *